(12) United States Patent
Beale

(10) Patent No.: US 12,006,409 B2
(45) Date of Patent: Jun. 11, 2024

(54) FIBREGLASS REINFORCED PLASTIC

(71) Applicant: Hydrawall Pty Ltd., Jandakot (AU)

(72) Inventor: Lewis John Beale, Jandakot (AU)

(73) Assignee: HYDRAWALL PTY LTD., Jandakot (AU)

( * ) Notice: Subject to any disclaimer, the term of this patent is extended or adjusted under 35 U.S.C. 154(b) by 0 days.

(21) Appl. No.: 18/311,798

(22) Filed: May 3, 2023

(65) Prior Publication Data

US 2023/0272172 A1 Aug. 31, 2023

Related U.S. Application Data

(63) Continuation of application No. 17/490,903, filed on Sep. 30, 2021, now Pat. No. 11,702,517.

(60) Provisional application No. 63/090,848, filed on Oct. 13, 2020.

(30) Foreign Application Priority Data

Oct. 2, 2020 (AU) ................... 2020903571
Jan. 7, 2021 (CA) ................... CA 3105263

(51) Int. Cl.
| | |
|---|---|
| *C08J 5/04* | (2006.01) |
| *B01F 23/00* | (2022.01) |
| *C08K 3/04* | (2006.01) |
| *C08K 7/14* | (2006.01) |
| *C08L 25/04* | (2006.01) |
| *E04H 4/00* | (2006.01) |

(52) U.S. Cl.
CPC ............ *C08J 5/043* (2013.01); *B01F 23/00* (2022.01); *C08K 3/042* (2017.05); *C08K 7/14* (2013.01); *C08L 25/04* (2013.01); *E04H 4/00* (2013.01); *C08K 2201/005* (2013.01)

(58) Field of Classification Search
CPC ..... C08J 5/04; C08K 3/04; C08K 7/14; C08L 25/04
USPC ................................................ 524/494
See application file for complete search history.

(56) References Cited

FOREIGN PATENT DOCUMENTS

| CN | 105802019 B | | 7/2016 |
| CN | 105802019 | * | 7/2017 |
| CN | 111410829 A | | 7/2020 |

OTHER PUBLICATIONS

Saravanakumar, K., et al., "Influence of Milled Glass Fiber Fillers on Mode I & Mode II Interlaminar Fracture Toughness of Epoxy Resin for Fabrication of Glass/Epoxy Composites," Fibers 2020, 8, 36, pp. 1-18.
PCT/AU2021/051153, International Search Report, Nov. 12, 2021, 5 pages.
AU2021240305, Australian Examination Report, Nov. 16, 2021, 8 pages.

* cited by examiner

*Primary Examiner* — Deve V Hall
(74) *Attorney, Agent, or Firm* — Kilpatrick Townsend & Stockton LLP

(57) ABSTRACT

Provided herein is a resin composition containing milled fibreglass and graphene. Also provided herein is a composite material containing cured resin composition, fibreglass reinforced resin containing the composite material and further fibreglass, a laminate including a layer of the fibreglass reinforced resin, and methods of making the resin composition, composite material and fibreglass reinforced resin. The composition, composite material and fibreglass reinforced resin and laminate find use in, for example, the construction of swimming pools and spa pools.

13 Claims, 7 Drawing Sheets

FIBREGLASS REINFORCED PLASTIC

CROSS-REFERENCE TO RELATED APPLICATIONS

This disclosure is a continuation of U.S. patent application Ser. No. 17/490,903, filed Sep. 30, 2021, which claims priority to Australian Application No. 2020903571, filed 2 Oct. 2020, U.S. Patent Application No. 63/090,848, filed 13 Oct. 2020, and to Canadian Application No. 3105263, filed 7 Jan. 2021 the contents each of which is incorporated herein by reference for all purposes.

FIELD

This disclosure generally relates to fibreglass reinforced plastic, in particular to fibreglass reinforced plastic which contains dispersed graphene. The fibreglass reinforced plastic finds use in the manufacture of fibreglass laminates suitable for the construction of swimming pools and spa pools.

BACKGROUND

Fibreglass reinforced plastic (FRP) is a composite material made of a polymer matrix reinforced with fibres. FRP is commonly used in the aerospace, automotive, marine, and construction industries and finds widespread use in the manufacture of pre-formed swimming pools.

FRP swimming pools may be manufactured by spraying a mixture of chopped fibreglass and uncured polymer resins onto a mould to provide a layer of fibreglass composite material. The layer of composite material may be augmented with other layers so as to provide a laminate structure. The laminate structure may comprise several layers of FRP and layers of non-FRP materials, such as polyester gelcoats and a structural core. After curing, the structure is released from the mould.

Other methods of manufacturing a FRP swimming pool include wet layup, however the spray method is advantageous from an economic perspective.

Despite advances in FRP composites, developing consumer regulations and statutory requirements governing the strength requirements for fibreglass swimming pools to withstand the soil loadings and conditions such as expansive clay, and hydrostatic and hydrodynamic pressure has created a need to increase the flexural strength and flexural modulus of a fibreglass swimming pool to withstand these additional loads.

Graphene is known to increase the strength and durability of composite materials however it is difficult to homogeneously disperse the graphene throughout uncured polymer resin.

Often large visible particles and agglomerates of graphene may remain which may compromise strength or, in the case of application in swimming pool manufacture, may promote osmotic blistering.

In view of the foregoing, it would be desirable to develop new fibreglass reinforced plastic composites that address one or more of the aforementioned needs or problems.

The reference in this specification to any prior publication (or information derived from it), or to any matter which is known, is not, and should not be taken as an acknowledgement or admission or any form of suggestion that the prior publication (or information derived from it) or known matter forms part of the common general knowledge in the field of endeavour to which this specification relates.

SUMMARY

The present disclosure is directed to resin compositions, composite materials, fibreglass reinforced plastic, and laminates containing the fibreglass reinforced plastic. In particular, the present disclosure is directed to composite materials containing cured polymer resin, graphene, milling media and milled fibreglass. The graphene is present in a dispersed state which advantageously provides high strength to the composites. Laminates containing fibreglass reinforced plastic according to the present disclosure also demonstrate reduced levels of moisture uptake compared with conventional laminates. Reduced levels of moisture uptake can be beneficial for properties such as lifetime of the laminate.

In one aspect the present disclosure provides a resin composition, said resin composition comprising:
 a) one or more curable resins;
 b) graphene;
 c) one or more milling media; and
 d) milled fibreglass.

In embodiments, the one or more milling media have a diameter between about 30 micron and about 150 micron.

In embodiments, the one or more milling media are hydrophobic.

In embodiments, the one or more milling media are insoluble in the resin composition.

In embodiments, the one or more milling media are inert.

In embodiments, the crushing strength of the one or more milling media may be greater than about 2000 psi (13.79 MPa), or greater than about 3000 psi (20.70 MPa), or greater than about 4000 psi (27.58 MPa).

In some embodiments, the crushing strength of the one or more milling media may be between about 2000 psi (13.79 MPa) and about 4000 psi (27.58 MPa).

In embodiments, the one or more milling media may have a Mohs hardness of greater than about 4, or greater than about 5, or greater than about 6.

In embodiments, the one or more milling media may have a Mohs hardness from about 4 to about 7, or from about 5 to about 7.

In embodiments, the one or more milling media comprise one or more of silicon oxides or aluminium oxides.

In embodiments, the one or more milling media comprise one or more of hollow glass microspheres, cenospheres and expanded glass aggregate.

In embodiments, the resin composition comprises:
 a) from about 50 wt. % to about 80 wt. % of one or more curable resins;
 b) from about 0.1 wt. % to about 2 wt. % graphene;
 c) from about 0.75 wt. % to about 35 wt. % of one or more milling media; and
 d) from about 3 wt. % to about 20 wt. % of milled fibreglass;
based on the total weight of resin composition.

In embodiments, the one or more curable resins comprise one or more curable polyester resins, vinyl ester resins and epoxy resins. The one or more curable resins may comprise one or more of bisphenol A vinyl ester resin, terephthalate resin, terephthalate-NPG resin, isophthalate resin, isophthalate-NPG resin, orthophthalate resin, orthophthalate-NPG resin, and urethane acrylate modified resins.

In embodiments, the one or more curable resins comprise a vinyl ester resin and terephthalate-NPG resin.

In embodiments, the one or more curable resins comprise a urethane acrylate modified resins.

In some embodiments, the amount of vinyl ester resin comprises greater than 10% by weight, based on the total weight of resin in the resin composition, 20% by weight, or greater than 30% by weight, or greater than 40% by weight, or greater than 50% by weight, or greater than 60% by weight, or greater than 70% by weight, or greater than 80% by weight, or greater than 90% by weight, based on the total weight of resin in the resin composition.

In embodiments, the graphene has an average platelet size between about 1 micron and about 100 micron, or between about 5 micron and about 50 micron, or between about 10 micron and about 30 micron.

In embodiments, the hollow glass microspheres have a diameter between about 30 micron and about 150 micron.

In embodiments, the hollow glass microspheres have a diameter between about 20 micron and about 150 micron.

In embodiments, the crushing strength of the hollow glass microspheres may be greater than 2000 psi (13.79 MPa), to enable processing and spraying without the collapse of the hollow glass microspheres.

In some embodiments, the crushing strength of the hollow glass microspheres may be between about 2000 psi (13.79 MPa) and about 3000 psi (20.70 MPa).

In embodiments, the hollow glass microspheres may have a Mohs hardness of greater than about 4, or greater than about 5, or greater than about 6.

In embodiments, the hollow glass microspheres may have a Mohs hardness from about 4 to about 7, or from about 5 to about 7.

In embodiments, the cenospheres have a diameter between about 30 micron and about 150 micron.

In embodiments, the crushing strength of the cenospheres may be greater than about 3000 psi (20.70 MPa).

In some embodiments, the crushing strength of the cenospheres may be between about 3000 psi (20.70 MPa) and about 4000 psi (27.58 MPa).

In embodiments, the cenospheres may have a Mohs hardness of greater than about 4, or greater than about 5, or greater than about 6.

In embodiments, the cenospheres may have a Mohs hardness from about 4 to about 7, or from about 5 to about 7.

In some embodiments, the resin composition comprises both hollow glass microspheres and cenospheres.

In some embodiments, the milled fibreglass has a fibre length between about 100 microns and about 1000 microns.

In embodiments, the milled fibreglass further comprises a sizing agent.

In some embodiments, the resin composition further comprises a thixotropic agent, for example fumed silica, preferably hydrophobic fumed silica.

In some embodiments, the resin composition further comprises one or more accelerators, promoters, inhibitors, air release agents, wetting agents and silanes.

In some embodiments, the resin composition comprises a silane which is 3-methacryloxypropyltrimethoxysilane.

In some embodiments, the resin composition has a viscosity from about 500 cP (0.5 Pas) to about 6000 cP (6 Pas).

In another aspect the present disclosure provides a composite material, said composite material comprising:
a) one or more cured resins;
b) graphene;
c) one or more milling media; and
d) milled fibreglass.

In embodiments, the one or more milling media have a diameter between about 30 micron and about 150 micron.

In embodiments, the one or more milling media are hydrophobic.

In embodiments, the one or more milling media are insoluble in the composite material.

In embodiments, the one or more milling media are inert.

In embodiments, the crushing strength of the one or more milling media may be greater than about 2000 psi (13.79 MPa), or greater than about 3000 psi (20.70 MPa), or greater than about 4000 psi (27.58 MPa).

In some embodiments, the crushing strength of the one or more milling media may be between about 2000 psi (13.79 MPa) and about 4000 psi (27.58 MPa).

In embodiments, the one or more milling media may have a Mohs hardness of greater than about 4, or greater than about 5, or greater than about 6.

In embodiments, the one or more milling media may have a Mohs hardness from about 4 to about 7, or from about 5 to about 7.

In embodiments, the one or more milling media comprise one or more of silicon oxides or aluminium oxides.

In embodiments, the one or more milling media comprise one or more of hollow glass microspheres, cenospheres and expanded glass aggregate.

In embodiments, the composite material comprises:
a) from about 50 wt. % to about 80 wt. % of one or more cured resins;
b) from about 0.1 wt. % to about 2.0 wt. % graphene;
c) from about 0.75 wt. % to about 35 wt. % of one or more milling media; and
d) from about 3.0 wt. % to about 20 wt. % of milled fibreglass;
based on the total weight of the composite material.

In embodiments, the one or more cured resins comprise one or more cured polyester resins, cured vinyl ester resins and cured epoxy resins. The one or more cured resins may comprise one or more of bisphenol A vinyl ester resin, terephthalate resin, terephthalate-NPG resin, isophthalate resin, isophthalate-NPG resin, orthophthalate resin, orthophthalate-NPG resin and urethane acrylate modified resins.

In embodiments, the one or more cured resins comprise a cured vinyl ester resin and cured terephthalate-NPG resin.

In embodiments, the one or more cured resins comprise a cured urethane acrylate modified resin.

In some embodiments, the cured vinyl ester resin comprises greater than 10% by weight, based on the total weight of cured resin in the resin composition, or greater than 20% by weight, or greater than 30% by weight, or greater than 40% by weight, or greater than 50% by weight, or greater than 60% by weight, or greater than 70% by weight, or greater than 80% by weight, or greater than 90% by weight, based on the total weight of cured resin in the resin composition.

In embodiments, the graphene has an average platelet size between about 1 micron and about 100 micron, or between about 5 micron and about 50 micron, or between about 10 micron and about 30 micron.

In embodiments, the hollow glass microspheres have a diameter between about 30 micron and about 150 micron.

In embodiments, the crushing strength of the hollow glass microspheres may be greater than 2000 psi (13.79 MPa), to enable processing and spraying without the collapse of the hollow glass microspheres.

In some embodiments, the crushing strength of the hollow glass microspheres may be between about 2000 psi (13.79 MPa) and about 3000 psi (20.70 MPa).

In embodiments, the glass microspheres may have a Mohs hardness of greater than about 4, or greater than about 5, or greater than about 6.

In embodiments, the glass microspheres may have a Mohs hardness from about 4 to about 7, or from about 5 to about 7.

In embodiments, the cenospheres have a diameter between about 20 micron and about 150 micron.

In embodiments, the cenospheres have a diameter between about 30 micron and about 150 micron.

In embodiments, the crushing strength of the cenospheres may be greater than about 3000 psi (20.70 MPa).

In some embodiments, crushing strength of the cenospheres may be between about 3000 psi (20.70 MPa) and about 4000 psi (27.58 MPa).

In embodiments, the cenospheres may have a Mohs hardness of greater than about 4, or greater than about 5, or greater than about 6.

In embodiments, the cenospheres may have a Mohs hardness from about 4 to about 7, or from about 5 to about 7.

In embodiments, the composite material comprises both hollow glass microspheres and cenospheres.

In embodiments, the milled fibreglass has a fibre length between about 200 microns and about 1000 microns.

In embodiments, the milled fibreglass further comprises a sizing agent.

In embodiments, the composite material further comprises one or more thixotropic agents, for example fumed silica, preferably hydrophobic fumed silica.

In another aspect of the present disclosure there is provided a fibreglass reinforced resin comprising the composite material according to any one or more of the herein disclosed embodiments and further fibreglass.

In embodiments, the further fibreglass has a fibre length greater than about 1 mm, or greater than about 5 mm, or greater than about 8 mm.

In embodiments, the further fibreglass has a fibre length from about 5 mm to about 20 mm, or from about 8 mm to about 16 mm.

In embodiments, the fibreglass reinforced resin has a flexural strength greater than about 124 MPa, or greater than about 130 MPa, or greater than about 140 MPa, or greater than about 150 MPa, or greater than about 160 MPa.

In embodiments, the fibreglass reinforced resin has a flexural strength between about 124 MPa and about 160 MPa, or between about 140 MPa and about 160 MPa.

In embodiments, the fibreglass reinforced resin has a flexural modulus greater than about 6,750 MPa, or greater than about 7,000 MPa, or greater than about 7,250 MPa, or greater than about 7,500 MPa, or greater than about 7,700 MPa, or greater than about 8,000 MPa, or greater than about 8,500 MPa, or greater than about 9,000 MPa, or greater than about 9,500 MPa, or greater than about 10,000 MPa.

In embodiments, the fibreglass reinforced resin has a flexural modulus between about 7,700 MPa and about 10,000 MPa, or between about 8,500 MPa and about 10,000 MPa.

In embodiments, the fibreglass reinforced resin has a tensile strength greater than about 100 MPa, or greater than about 110 MPa, or greater than about 120 MPa, or greater than about 130 MPa, or greater than about 140 MPa.

In embodiments, the fibreglass reinforced resin has a tensile strength between about 100 MPa and about 140 MPa, or between about 110 MPa and about 140 MPa.

In another aspect of the present disclosure there is provided a laminate comprising one or more layers of fibreglass reinforced resin according to any one or more of the herein disclosed embodiments.

In embodiments, the laminate may further comprise one or more layers of another material, for example one or more layers of a polymer or mixtures of polymers.

In embodiments, the one or more other layers comprise one or more gelcoats. The nature of the gelcoat is not particularly limited and includes materials typically utilized as gelcoats in the manufacture of swimming pools and in the marine industry.

In embodiments, the gelcoat may comprise one or more layers.

Exemplary gelcoats comprise one or more polyesters and vinyl esters. In some embodiments, the gelcoat is a polyester gelcoat. In some embodiments, the gelcoat is a vinyl ester gelcoat.

In another aspect of the present disclosure there is provided a swimming pool or spa pool comprising a laminate according to any one or more of the herein disclosed embodiments.

In another aspect of the present disclosure there is provided a method of preparing a resin composition according to any one or more of the herein disclosed embodiments, said method comprising:

a) forming a mixture of one or more curable resins, graphene, and one or more milling media;

b) agitating the mixture to disperse the graphene; and c) adding milled fibreglass.

The method may further comprise adding one or more thixotropic, air release, wetting agents and/or silanes.

The method may further comprise degassing the resin composition.

In another aspect of the present disclosure there is provided a method of preparing a resin composition according to any one or more of the herein disclosed embodiments, said method comprising the following steps:

a) forming a mixture of one or more curable resins, graphene, and one or more milling media;

b) agitating the mixture to disperse the graphene;

c) combining the mixture formed in b) with one or more further curable resins and one or more further milling media, and agitating to further disperse the graphene; and d) adding milled fibreglass.

The method may further comprise the step of adding one or more thixotropic, air release, wetting agents and/or silanes.

The method may further comprise the step of degassing the resin composition.

In another aspect of the present disclosure there is provided a method of preparing a composite material according to any one or more of the herein disclosed embodiments comprising curing a resin composition according to any one or more of the herein disclosed embodiments.

In another aspect of the present disclosure there is provided a method of manufacturing a fibreglass reinforced resin comprising the step of spraying a mixture comprising a resin composition according to any one or more of the herein disclosed embodiments and fibreglass rovings and curing the resin.

The fibreglass reinforced plastic as disclosed herein may comprise one or more of the following advantages in comparison to traditional fibreglass reinforced plastics:
  significantly higher flexural strength
  significantly higher flexural modulus
  significantly higher tensile strength.

The laminates as disclosed herein may comprise one or more of the following advantages:
  Low water vapour transmission through the laminate
  Less likely to generate osmotic blistering
  High water resistance
  High chemical resistance.

These performance advantages make the herein disclosed fibreglass reinforced resins and laminates ideally suited in the manufacture of swimming pools and/or spa pools.

Further features and advantages of the present disclosure will be understood by reference to the following drawings and detailed description.

DETAILED DESCRIPTION

Figure 1:
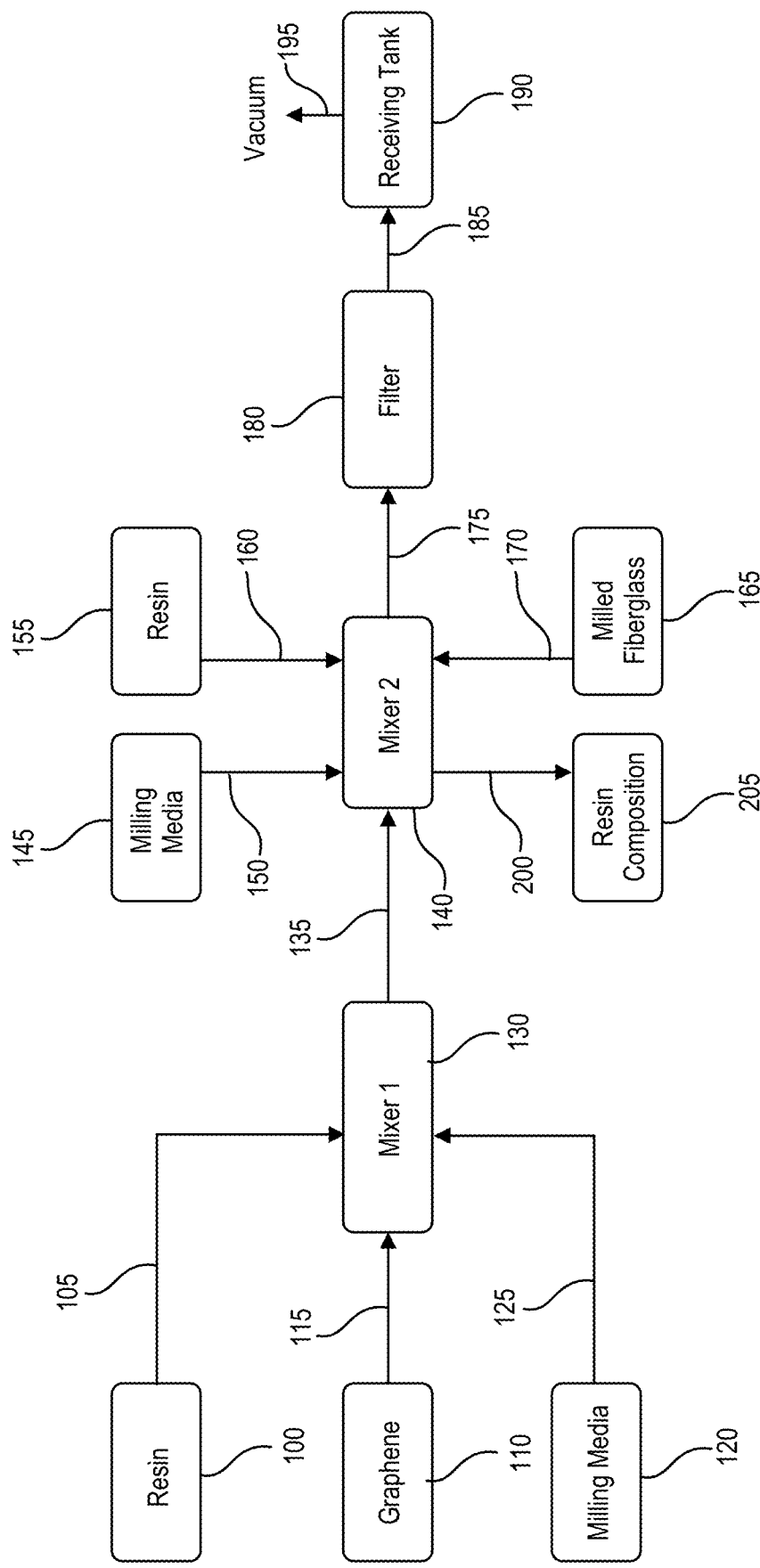
FIG. 1 is a flow diagram of a method of making a resin composition according to one embodiment of the present disclosure.

The following is a detailed description of the disclosure provided to aid those skilled in the art in practicing the present disclosure. Those of ordinary skill in the art may make modifications and variations in the embodiments described herein without departing from the spirit or scope of the present disclosure.

Although any processes and materials similar or equivalent to those described herein can also be used in the practice or testing of the present disclosure, the preferred processes and materials are now described.

It must also be noted that, as used in the specification and the appended claims, the singular forms 'a', 'an' and 'the' include plural referents unless otherwise specified. Thus, for example, reference to 'resin' may include more than one resins, and the like.

Throughout this specification, use of the terms 'comprises' or 'comprising' or grammatical variations thereon shall be taken to specify the presence of stated features, integers, steps or components but does not preclude the presence or addition of one or more other features, integers, steps, components or groups thereof not specifically mentioned.

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as Hawley's Condensed Chemical Dictionary 14th Edition, by R. J. Lewis, John Wiley & Sons, New York, N.Y., 2001.

Unless specifically stated or obvious from context, as used herein, the term "about" is understood as within a range of normal tolerance in the art, for example within two standard deviations of the mean. 'About' can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein in the specification and the claim can be modified by the term 'about'.

Any processes provided herein can be combined with one or more of any of the other processes provided herein.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

As used herein, the term 'cenosphere' refers to spheres made largely of silica and alumina which are typically produced as a coal production by-product in thermal power plants.

As used herein, the term 'hollow glass microsphere', also known as micro balloons or glass bubbles, refers to hollow spheres of, for example, a sodium silicate glass, typically prepared by ultrasonic spray pyrolysis of water glass.

As used herein the term 'expanded glass aggregate' refers to granular glass made from post-consumer glass.

Reference will now be made in detail to exemplary embodiments of the disclosure. While the disclosure will be described in conjunction with the exemplary embodiments, it will be understood that it is not intended to limit the disclosure to those embodiments. To the contrary, it is intended to cover alternatives, modifications, and equivalents as may be included within the spirit and scope of the disclosure as defined by the appended claims.

The present disclosure is directed to resin compositions, composite materials, fibreglass reinforced plastic, and laminates containing the fibreglass reinforced plastic. In particular, the present disclosure is directed to composite materials containing cured polymer resin, graphene, milling media and milled fibreglass. The graphene is present in a dispersed state which advantageously provides high strength to the composites.

Resin Composition

In embodiments, the resin composition according to the present disclosure comprises curable resin, graphene, milling media and milled glass fibres.

The resin composition may comprise:
  a) from about 50 wt. % to about 80 wt. % of one or more curable resins;

b) from about 0.1 wt. % to about 2.0 wt. % graphene;
c) from about 0.75 wt. % to about 35 wt. % of one or more milling media; and
d) from about 3 wt. % to about 20 wt. % of milled fibreglass;

based on the total weight of resin composition.

Curable Resin

Any curable resin, or mixture of curable resins, typically used in the manufacture of fibreglass reinforced plastic may be utilized.

In some embodiments, the one or more curable resins comprise one or more curable polyester resins, vinyl ester resins and epoxy resins. The polyester resins may comprise one or more of bisphenol A vinyl ester resin, terephthalate resin, terephthalate-NPG resin, isophthalate resin, isophthalate-NPG resin, orthophthalate resin, and orthophthalate-NPG resin. NPG refers to 2,2-dimethyl-1,3-propanediol (neopentyl glycol).

In some embodiments, a hybrid resin is used. Hybrid resins include, for example, combinations of resins, such as combinations of the resin types listed above.

In some embodiments, a urethane acrylate modified resin is used.

In some embodiments, the curable resin comprises a mixture of a vinyl ester resin and least one other resin. In embodiments, the vinyl ester resin comprises greater than 10% by weight, based on the total weight of resin in the resin composition, or greater than 20% by weight, or greater than 30% by weight, or greater than 40% by weight, or greater than 50% by weight, or greater than 60% by weight, or greater than 70% by weight, or greater than 80% by weight, or greater than 90% by weight, based on the total weight of resin in the resin composition.

Graphene

In embodiments, the graphene has an average platelet size between about 1 micron and about 100 micron, or between about 5 micron and about 50 micron, or between about 10 micron and about 30 micron. The platelet size may be determined by laser diffraction techniques.

Milling Media

Numerous materials may be suitable as milling material. Any material that is capable of dispersing the graphene through a milling process may be utilised. Preferred milling materials are also substantially chemically and/or mechanically inert during the manufacture of the resin composition and subsequent composites and fibreglass reinforced resins. A unique feature of the present disclosure is that the milling media are not removed from the resin composition after serving the purpose of dispersing the graphene, but are retained in the subsequently formed composites and fibreglass reinforced resins. As one use of the fibreglass reinforced resins is in the manufacture of swimming pools, the milling media must remain inert for extended periods of time and should not compromise the structural integrity of the fibreglass reinforced resin when exposed to water. Preferably, the milling material is substantially insoluble in the resin composition. Preferred milling media are also substantially hydrophobic.

Preferred milling media have sufficiently high crush strength during the milling process such that their structural integrity is largely retained.

Suitable milling media comprise one or both of silicon oxide and aluminium oxides. Exemplary milling media comprise one or more of hollow glass microspheres, cenospheres and expanded glass aggregate.

Without being bound by any particular theory, it is considered that the presence of milling media such as microspheres assists in reducing water and moisture uptake as well as assisting in dispersion of graphene particles.

In embodiments, the milling media have a diameter between about 30 micron and about 150 micron.

Hollow Glass Microspheres

The hollow glass microspheres typically have a diameter from between about 10 micron to about 300 micron, or from about 30 micron to about 150 micron. The particle size of the hollow glass microspheres may be measured by sieving techniques or by laser diffraction. The glass microspheres may have a density between about 0.3 and about 0.6 g/ml.

Cenospheres

The cenospheres typically have a diameter from between about 20 micron to about 150 micron. In some embodiments, the cenospheres have a diameter from between about 30 micron to about 150 micron. The particle size of the cenospheres may be measured by sieving techniques or by laser diffraction. The cenospheres may have a density between about 0.4 and about 0.8 g/ml.

Milled Fibreglass

The milled fibreglass may comprise E-Glass or E-CR corrosion resistant glass.

The milled fibreglass may have a fibre length between about 200 microns and about 1000 microns.

In embodiments, the milled fibreglass may have an aspect ratio of about 25-30:1.

The milled fibreglass may be treated with a sizing agent. The skilled person would be well aware of sizing agents typically used in the art of fibreglass reinforced plastic, such as, for example, silanes.

In embodiments the milled fibreglass may have a moisture content of less than 0.15% by weight.

Resin Composition Viscosity

In some embodiments, the viscosity of the resin composition is within a range enabling it to be sprayed.

Preferably the viscosity of the resin composition is between about 500 cP (0.5 Pas) and about 6000 cP (6 Pas).

If necessary, the viscosity of the resin composition may be adjusted through the addition of a suitable thixotropic agent. Exemplary thixotropic agents include fumed silica, particularly hydrophobic fumed silica.

FIG. 1 is a flow diagram illustrating one embodiment of a method for making a resin composition according to the present disclosure.

In a first step, one or more curable resins (100), graphene (110) and one or more milling media (120) are added to batch mixer 1 (130) via, respectively, lines 105, 115 and 125. The order of addition is not critical. The resulting mixture is then agitated to disperse the graphene in the resin. Subsequently, the contents of mixer 1 are transferred to batch mixer 2. Further resin (155) and further one or more milling media (145) are added to mixer 2 via, respectively, lines 160 and 150. The further one or more milling media (145) may be the same or different to the one or more milling media (120). Mixer 2 is connected to vacuum system via filter (180) and receiving tank (190) and the mixture is further agitated under vacuum to degas the resin composition. After mixing in mixer 2, milled fibreglass (165) is added via line 170. The contents of mixer 2 are transferred via line 200 to storage vessel (205) for subsequent use in composite material and laminate manufacture.

Optionally, in some embodiments, further additives, such as thixotropic agents, wetting agents and air release agents are added to mixer 2 prior to transfer to storage vessel (205). Preferably, these further additives are added after addition of the further resin to mixer 2, but before addition of the further milling media.

In some other embodiments, further additives, such as thixotropic agents, wetting agents and air release agents are added and dispersed into the resin composition prior to vacuum application. On completion of removal of the air from the resin composite mixture the fluid is transferred to storage vessel (205). Preferably, these further additives are added after addition of the further resin to mixer 2, but before addition of the further milling media.

In the herein disclosed methods of making the resin composition the milling media act to disperse the graphene in the resin composition. When the resin composition is agitated they assist in dispersing the graphene, however they also remain in the resin composition.

In some embodiments, a mixture containing graphene, a curable resin and one or more milling media are mixed for a period of at least 30 minutes, for example the mixture may be mixed for a period in the range of from 30 minutes to 1 hour, prior to admixing with other components (e.g. milled fibreglass, further resin, further milling media).

Preferred milling media are inert and insoluble in the resin composition and inert and insoluble in the cured composite material. This is important when the resin composition is utilised in the manufacture of laminate structure for a fibreglass swimming pool. It was found that hollow glass microspheres and cenospheres were suitable to be used in the milling process. These materials did not induce osmotic blistering and potential early degradation of the fibreglass laminate when the laminate was exposed to water for extended periods of time, as is the case of a swimming pool.

In embodiments, the milling media also enhance the physical strength and chemical and water resistance of the fibreglass laminate while also performing the function of milling media to disperse the graphene in the resin composition.

Preferably the milling media should have sufficient crush strength to prevent excessive crushing during the milling and spraying processes.

In embodiments, the milling media added to mixer 1 may comprise one or more of hollow glass microspheres, cenospheres and expanded glass aggregate.

In embodiments, the milling media added to mixer 2 may comprise one or more of hollow glass microspheres, cenospheres and expanded glass aggregate.

In some preferred embodiments, the milling media added to mixer 1 may comprise hollow glass microspheres.

In some preferred embodiments, the milling media added to mixer 2 may comprise cenospheres.

A preferred mixer for mixer 1 is equipped with mixing blades that minimises crushing and break down of the milling media.

In an embodiment, about 15 wt. % of the total resin amount of the final resin composition is added to mixer 1 along with the graphene and milling media. The mixture is agitated preferably with a maximum mixer speed of 100 rpm. It is preferred that high shear is avoided so as to minimise crushing of the milling media. Mixing is continued until the graphene appears well dispersed.

In an embodiment, graphene is mixed in mixer 1 with a portion of the resin and a portion of the milling media (e.g. at high concentration) until the graphene is at least partially dispersed. An amount of the mixture is then transferred into mixer 2, the remainder of the resin and milling media are added to mixer 2, and the components are mixed until the graphene has been sufficiently dispersed and agglomerates reduced to smaller particles. For example, the mixing period in mixer 2 may be about 30 minutes.

Preferably the milling media are hydrophobic as they are retained within the fibreglass reinforced resin and subjected to the long-term water vapour transpiration through the laminate structure.

On completion of the initial dispersion in mixer 1 the fluid containing the resin, graphene and milling media are transferred into mixer 2 which is designed to operate under vacuum.

At this time, any required accelerators, promoters, inhibitors, air release agents, wetting agents and low styrene emission additives may be added into the resin mix.

In embodiments, further resin is transferred into mixer 2 via an inlet port. At this point, the mixer may be agitated at relatively low speed, for example in the range 50-100 rpm, until the resin fully covers the mixing blades.

In embodiments, mixer 2 contains internal baffles to prevent the fluid from circulating at excessive speed and to disrupt the fluid flow and add turbulence to the milling process.

A preferred mixer forces fluid against the baffles of the mixer and agitates the milling media against the graphene. Additionally, a preferred mixer forces the fluid downward from top to bottom thus increasing turbulence within the mixer. If desired, the speed of the mixer may be varied, e.g. increased to aid dispersion and to continue agitation of the fluid.

After addition of the further resin to mixer 2, a thixotropic agent, such as hydroscopic fumed silica, if required, may be added to adjust the viscosity of the mixture. At this time, vacuum may be applied to mixer 2. Preferably, vacuum is applied following completion of the mixing process.

In embodiments, the mixing speed is increased and further milling media added. The total resin composition comprising, resin, graphene and milling media is continued to be mixed until the graphene is fully dispersed within the composition.

Mixer 2 represents the secondary stage of the dispersing process. The milling media initially disperse the graphene in the smaller resin amount in mixer 1, enabling further dispersion into the total volume of resin when further milling media and resin are added in mixer 2.

The combined action of agitation, turbulence and shear allow the milling media to shear and disperse the graphene into the resin composition. Preferably, the final dispersion of the graphene into the resin and milling media occurs in mixer 2.

When the graphene is fully dispersed in the resin the milled fibreglass is added.

The milled fibreglass is added to increase the flexural strength and the flexural modulus of the fibreglass reinforced resin.

It was observed that the addition of milled fibreglass not only increased the flexural strength and flexural modulus of the cured composite material, it allowed the resin composition to retain its integrity such that agglomeration of components was minimised within normal expected manufacturing time restraints, and assists with the retention of the milling media in suspension. Accordingly, a consistently even, homogenous, smooth and sprayable resin composition may be prepared.

For use in the spray process it is important that the resin composition is able to be sprayed with continuous fibreglass rovings. It must be able to be laid down evenly and to be able to be rolled out through the sprayed continuous fibreglass rovings and to be able to wet out the fibreglass.

It was observed that during the milling process, in the absence of applied vacuum, a significant quantity of air may be entrapped within the resin composition. By comparing the measured density of the resin composition to the calculated density, the measured density was less than expected.

By applying vacuum to the resin composition, the measured density increased so as to be comparable to the calculated density. This was found to be advantageous as it resulted in composite materials with less entrapped micro voids of air.

In embodiments, vacuum may be applied to the resin composition for about 10 minutes to about 1 hour. In some embodiments, vacuum may be applied at the completion of the manufacture of the resin composition to maximise the removal of air from the composition and minimise the number of microvoids of air.

Further Additives

Further additives, such as one or more accelerators, promoters, inhibitors, air release agents, wetting agents, silanes, and low styrene emission additives may be added during or after production of the resin composition.

In some embodiments, one or more silanes is added, more particularly an organosilane. The silanes act as wetting agents. They can be used to improve the physical characteristics of the resin compositions. Without being bound by any particular theory, it is considered that the silanes can treat the surface of asicular silicon-based fibres, modifying the surface of the fibres by affecting properties such as zeta potential and/or hydrophobicity. It is considered that these properties can in turn modify the chemistry of the interphase, and affect the performance of the fibre reinforced composites, particularly those with very short fibres.

Examples of silanes include vinyltrimethoxysilane (VTMS), phenyltrimethoxysilane (PTMS), aminopropyltrimethoxysilane (APTMS), (2-aminoethyl)-3-aminopropyltrimethoxysilane (AEAPTMS), N-cyclohexyl-3-aminopropyltrimethoxysilane (CHAPTMS), 3-aminopropyltriethoxysilane (APTES), N-(2-aminoethyl)-3-aminopropylmethyldimethoxysilane (AEAPMDMS), N-(2-aminoethyl)-3-aminopropylmethoxypolysiloxane (AEAPMPS), 3-methacryloxypropyltrimethoxysilane (MAOPTMS), methacryloxymethylmethyldimethoxysilane (MAOMMDMS), methacryloxymethyltrimethoxysilane (MAOMTMS), glycidoxypropyltrimethoxysilane (GOPTMS), 4-glycidoxypropyltrimethoxysilane, 6-glycidoxypropyltrimethoxysilane and octyltriethoxysilane (OTES).

In some embodiments, 3-methacryloxypropyltrimethoxysilane is incorporated into the resin composition.

Where a silane is used, it is typically added in an amount in the range of from 0.5 wt % to 5 wt % of the resin composition, or from 1 wt % to 4 wt %, or from 0.5 wt % to 1 wt %, or from 1 wt % to 2 wt %, or from 2 wt % to 3 wt %, or from 3 wt % to 4 wt %, or from 4 wt % to 5 wt %.

Where a further additive or additives is/are added, in some embodiments, the further additive(s) is/are added to mixer 2 prior to adding the milling media and the milled glass. Where a further resin is added, in some embodiments where a further additive or additives is/are added, the further additive(s) is/are added to mixer 2 prior to adding the further resin.

Preferred promoters include metal promoters such as one or more of zinc octoate, potassium octoate and cobalt octoate. Other promoters that can suitably be used include, but are not limited to, SHEN catalyst PC-6 and dimethyl aniline. Defoaming agents and wetting agents typically used in the art may be added as required.

Composite Material

The resin composition may be cured to provide the composite material according to the present disclosure.

Fibreglass Reinforced Resin

The resin composition may be combined with further fibreglass and cured to provide the herein disclosed fibreglass reinforced resin.

In embodiments, the further fibreglass comprises fibreglass rovings with an average cut length from about 5 mm to about 20 mm.

The fibreglass rovings may comprise E-Glass or 6-ECR corrosion resistant glass.

The fibreglass rovings may be treated with a sizing agent. The skilled person would be well aware of sizing agents typically used in fibreglass reinforced plastic, such as, for example, silanes.

In embodiments, the fibreglass rovings may have a moisture content of less than 0.15% by weight.

In embodiments, the weight ratio of resin composition to fibreglass rovings may be between about 2:1 and about 4:1, depending on the structural composition of the finished laminate. In some embodiments, the weight ratio of resin composition to fibreglass rovings may be between about 2:1 and about 2.5:1. In some embodiments, the weight ratio of resin composition to fiberglass rovings may be between about 2:1 and about 3:1. In alternate embodiments, the weight ratio of resin composition to fibreglass rovings may be between about 3:1 and about 4:1.

Laminates

The present disclosure also provides laminate structures comprising one or more layers of fibreglass reinforced resin and optionally one or more layers of another material.

In embodiments, the laminates may comprise one, or two, or three, or four, or five, or more layers of the graphene-containing fibreglass reinforced resin. The layers of fibreglass reinforced resin may be the same or may be different. For example, the layers of fibreglass reinforced resin may comprise different cured resins and/or different relative amounts of resin, graphene, milling media, milled fibreglass, and fibreglass rovings, depending on the particular end use.

For the construction of a swimming pool or spa pool, one or more layers of gelcoats may be present as outer layers (exposed to water). These gelcoats may comprise additives such as promoters and inhibitors.

In some embodiments, the laminate contains one or more layers of fibreglass reinforced resin, and one or more gelcoat layers. In some embodiments, the laminate comprises two, three, four or five graphite-containing fibreglass reinforced resin layers, and one, two or three gelcoat layers. In some embodiments, the laminate comprises four graphite-containing fibreglass reinforced resin layers, and two gelcoat layers.

In some embodiments, the laminate contains multiple layers (e.g. two, three, four or five) of fibreglass reinforced resin. In some embodiments, the laminate does not comprise a gelcoat layer.

Preferred promoters include metal promoters such as one or more of zinc octoate, potassium octoate and cobalt octoate. Other promoters that can suitably be used include, but are not limited to, SHEN catalyst PC-6 and dimethyl aniline. Defoaming agents may be added as required.

At least one UV inhibitor and/or absorber or a light stabiliser may also be added to the gelcoats. In embodiments, two UV absorbers may be added, known commercially under the trade marks Tinuvin™ and Chimassorb™, each produced by BASF™ Specialty Chemicals Inc. Preferred blends are Tinuvin™ 384-2 and Chimassorb™ 1 19FL. Particularly preferred blends are Tinuvin™ 400 and Tinuvin™ 123. These UV absorbers and stabilisers act to improve the resistance of the gelcoats to UV exposure failures such as discoloration, cracking and fading.

In an exemplary embodiment of the manufacture of a laminate according to the present disclosure, a gelcoat layer or layers are sprayed onto a polished fibreglass mould and allowed to cure until trafficable.

Within about 30 minutes of the gelcoat curing sufficiently to allow an operator to walk on the floor of the gelcoat treated mould, a resin composition according to any of the embodiments of the present disclosure is sprayed onto the outer layer of the gelcoat using a chopper gun, for example using a Magnum Venus P31 chopper gun with spray boom.

In embodiments, the resin composition is first sprayed evenly over a section to be sprayed to wet out the area. Typically, wet film thickness should not exceed 0.5 mm.

Next, an appropriate thickness of resin composition and continuous fibreglass rovings is sprayed onto the wetted-out area of the mould. After 2-3 minutes to allow the resin to wet through, fibreglass rolling is commenced to remove air from the deposited resin composition and fibreglass.

The preferred length of the fibre to be deposited with the resin stream is about 12 mm. Corrosion resistant glasses, such as Jushi E6-ECR13 or CTG ER240-T132D TEX 2400 continuous roving, is a preferred fibreglass. Adjustment of the roller speed in the chopper gun may be required to spray the correct proportion of the resin composition with the chopped continuous fibreglass to achieve the desired final resin to glass ratio.

As the resin mix is not transparent due to the presence of graphene and the milling media present in the resin composition it is important to ensure that any air is removed. Cross sectional analysis under a microscope may be utilised to ensure the correct thicknesses have been applied and that the finished layer has been sufficiently rolled out to remove all visible air voids.

The resin composition and fibreglass layer are allowed to cure before the next application.

The process of spraying resin composition and chopped fibreglass may be repeated one or more times so as to afford multiple layers of fibreglass reinforced resin.

The thickness and composition of each fibreglass reinforced resin layer may be the same or different. For example, the relative amounts of resin, graphene, milling media, milled fibreglass and fibreglass rovings may be the same or different in each of the layers. Additionally, or alternatively, the nature of the resins may be the same or different.

After the final structural layer has been allowed to cure, an outer surface layer may be sprayed to a minimum thickness of about 0.35 mm to seal off any protruding fibres and prevent the ingress of moisture into the rear of the swimming pool laminate.

A typical laminate may for example have a thickness in the range of from 6 mm to 12 mm, e.g. about 10 mm.

The finished swimming pool is then allowed to cure on the mould for about 24 hours prior to demoulding.

As soil conditions vary from location to location it is possible, using the composites of the present disclosure, to design and manufacture a swimming pool to withstand any additional loads and especially those from reactive clay, hydrostatic pressure and hydrodynamic pressure.

Figure 2:
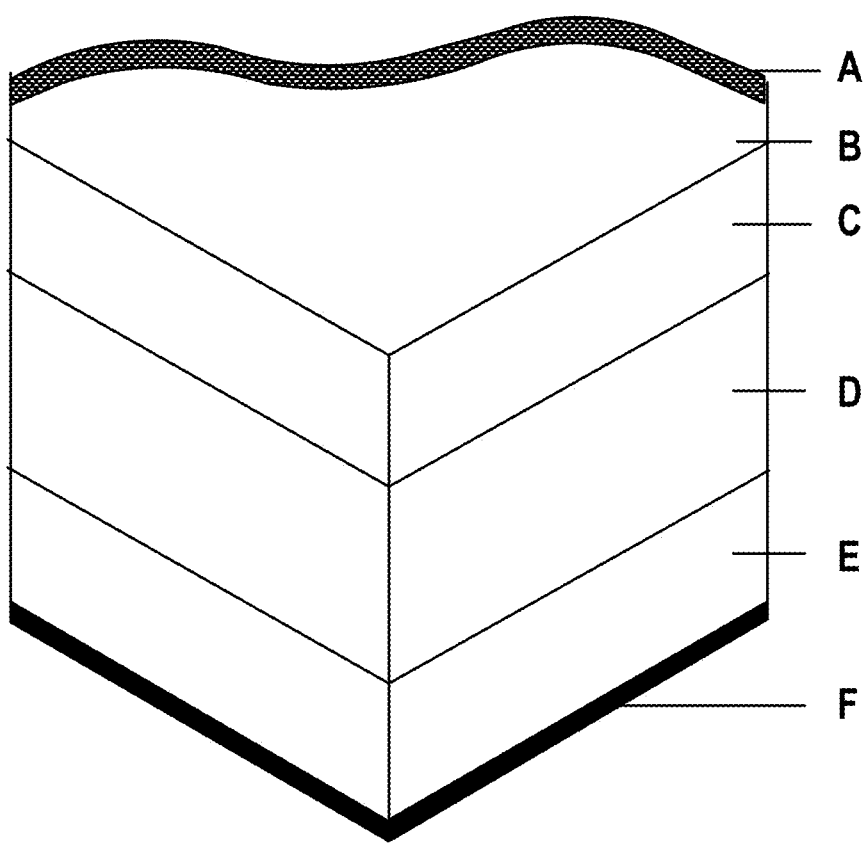
FIG. 2 is a representation of an embodiment of a laminate in accordance with the present disclosure.

An example of a laminate in accordance with the present disclosure is provided in FIG. 2. The laminate has the following layers: A) first gelcoat layer; B) second gelcoat layer; C) first chemical resistant and structural layer of fibreglass reinforced resin containing graphene, and fibreglass roving; D) layer of fibreglass reinforced resin containing graphene—syntactic core; E) second chemical resistant and structural layer of fibreglass reinforced resin containing graphene, and fibreglass roving; and F) layer of fibreglass reinforced resin containing graphene—water and chemical resistant outer composite layer. Such a laminate may find use in the manufacture of, for example, swimming pools.

Gelcoat layer A) may for example be pigmented or clear, and/or contain particles. Typically Layer A) comprises a resin such as, for example a bisphenol A vinyl ester resin, terephthalate resin, terephthalate-NPG resin, isophthalate resin, isophthalate-NPG resin, orthophthalate resin, orthophthalate-NPG resin, urethane acrylate modified resin, and hybrid resins or combinations of the above. This gelcoat layer is typically sprayed on, e.g. with a wet film thickness in the range of from 0.45 mm to 0.75 mm, for example from 0.6 mm to 0.75 mm. In some embodiments, layer A) has a thickness of about 0.5 mm, or about 0.55 mm, or about 0.6 mm, or about 0.65 mm, or about 0.7 mm, or about 0.75 mm.

Gelcoat layer B) may for example be pigmented or clear, and/or contain particles, but typically is pigmented and/or contains particles. Layer B) may for example comprise a resin such as, for example a bisphenol A vinyl ester resin, terephthalate resin, terephthalate-NPG resin, isophthalate resin, isophthalate-NPG resin, orthophthalate resin, orthophthalate-NPG resin, and/or urethane acrylate modified resin. In some embodiments, a bisphenol A vinyl ester resin is used for layer B). Layer B) provides chemical and water-resistant properties, and can also be used to provide colour to the laminate. Typically, after wet spraying and curing of gelcoat layer A) until trafficable, layer B) is sprayed onto the first, e.g. with a wet film thickness in the range of from 0.45 mm to 0.75 mm, or from 0.5 mm to 0.75 mm, or about 0.5 mm, or about 0.55 mm, or about 0.6 mm, or about 0.65 mm, or about 0.7 mm, or about 0.75 mm.

Layer C) is a structural layer having chemical resistance properties and comprises a resin, dispersed graphene, milling media and milled fibreglass. For example, the resin may be one or more of a bisphenol A vinyl ester resin, terephthalate resin, terephthalate-NPG resin, isophthalate resin, isophthalate-NPG resin, orthophthalate resin and orthophthalate-NPG resin. The milling media may for example be cenospheres and/or hollow glass microspheres. The layer may for example also contain fiberglass roving, such as Tex2400 continuous fibreglass roving. Typically, the total resin to fibreglass weight ratio in layer C) is in the range of from 2.0-2.5:1. Typically, a composition containing the resin, dispersed graphene, milling media and milled fibreglass is sprayed onto gelcoat layers A) and B) with fibreglass roving (e.g. Tex2400 continuous fibreglass roving. Air is rolled out, and the laminate allowed to gel/cure until trafficable. Typical thicknesses may be in the range of from 2.0 to 4.0 mm (e.g. for swimming pool applications, depending on engineering specifications), for example about 2.0 mm, or about 2.5 mm, or about 3.0 mm, or about 3.5 mm, or about 4.0 mm.

Layer D) is a syntactic core, and comprises a resin, graphene, milling media and milled fibreglass. For example, the resin may be one or more of a bisphenol A vinyl ester resin, terephthalate resin, terephthalate-NPG resin, isophthalate resin, isophthalate-NPG resin, orthophthalate resin and orthophthalate-NPG resin. The milling media may for example be cenospheres and/or hollow glass microspheres. Layer D) is typically sprayed on to layer C), e.g. with continuous passes, until the desired thickness is reached. Typical thicknesses are in the range of from 2.0 mm to 4.2 mm, or from 2.0 mm to 4.0 mm, or about 2.0 mm, about 2.5 mm, about 3.0 mm, about 3.5 mm, or about 4.0 mm. Whilst in some embodiments the laminate comprises layer D), in other embodiments layer D) may be omitted.

Layer E) is a further structural layer having chemical resistance properties, and comprises a resin, dispersed graphene, milling media and milled fibreglass. For example, the resin may be one or more of a bisphenol A vinyl ester resin, terephthalate resin, terephthalate-NPG resin, isophthalate resin, isophthalate-NPG resin, orthophthalate resin and orthophthalate-NPG resin. The milling media may for example be cenospheres and/or hollow glass microspheres. Typically, the resin to fibreglass weight ratio may be in the range of from 2.0-2.5:1. The layer may for example also contain fiberglass roving, such as Tex2400 continuous fibreglass roving. The basic components of layer E) are the same as in layer C) (e.g. it also contains a resin, graphene, milling media, milled fibreglass, and fibreglass roving), however the specific components (e.g. the resin used) may be the same or different. The ratio of materials used (e.g. the weight ratio of resin to fibreglass) may be the same or different to that used in layer C). Typically, a composition containing the resin, dispersed graphene, milling media and milled fibreglass is sprayed onto the preceding layers with fibreglass roving (e.g. Tex2400 continuous fibreglass roving. Air is rolled out, and the laminate allowed to gel/cure until trafficable. Typical thicknesses may be in the range of from 2.0 to 4.0 mm (e.g. for swimming pool applications, depending on engineering specifications), for example about 2.0 mm, or about 2.5 mm, or about 3.0 mm, or about 3.5 mm, or about 4.0 mm. The layer thickness is typically the same as or similar to the thickness of layer C).

Layer F) comprises a resin, graphene, milling media and milled fibreglass. The resin and milling media may for example be those described above for other layers of the laminate. Layer F) provides waterproofing properties, acting as a waterproof barrier. Layer F) is sprayed over the other layers providing a surface layer. Typical thicknesses for layer F) are in the range of from 0.3 mm to 0.4 mm, for example about 0.3 mm, about 0.35 mm or about 0.4 mm.

Another example of a laminate in accordance with the present disclosure is a laminate containing layers A), B), C), E) and F) as discussed above, but omitting layer D).

The contents of all references and published patents and patent applications cited throughout the application are hereby incorporated by reference.

EXAMPLES

Example 1: Resin Composition

Graphene-containing resin compositions according to the present disclosure were prepared. A mixture of graphene, styrene monomer, milled fibreglass, and milling media (cenospheres and hollow glass microspheres) was mixed using a rotor and stator mixing head. Samples of the composition were taken at different time points and subjected to microscopic examination.

Figure 3:
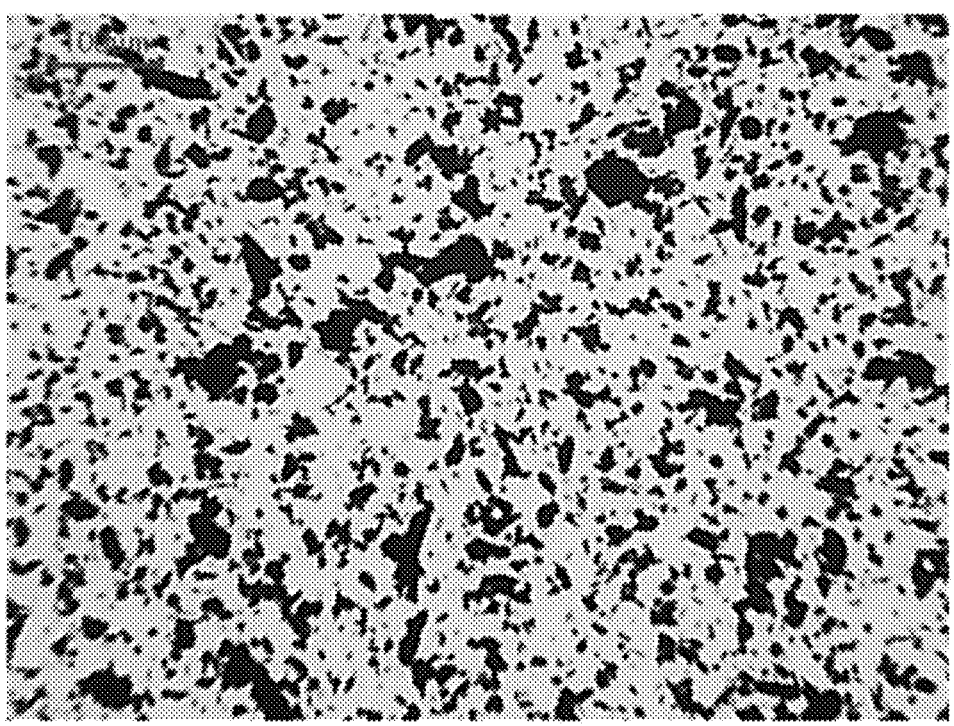
FIG. 3 is a microscopic image of a resin composition according to an embodiment of the present disclosure.
Figure 4:
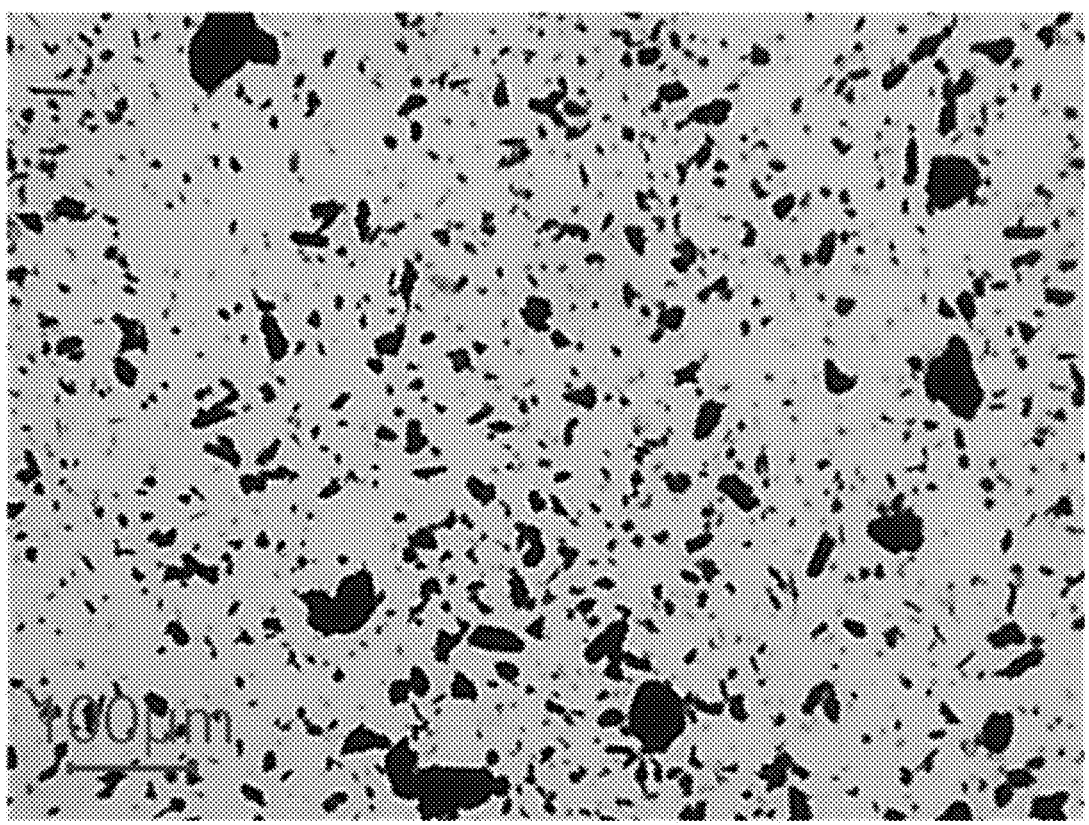
FIG. 4 is a microscopic image of a resin composition according to an embodiment of the present disclosure.
Figure 5:
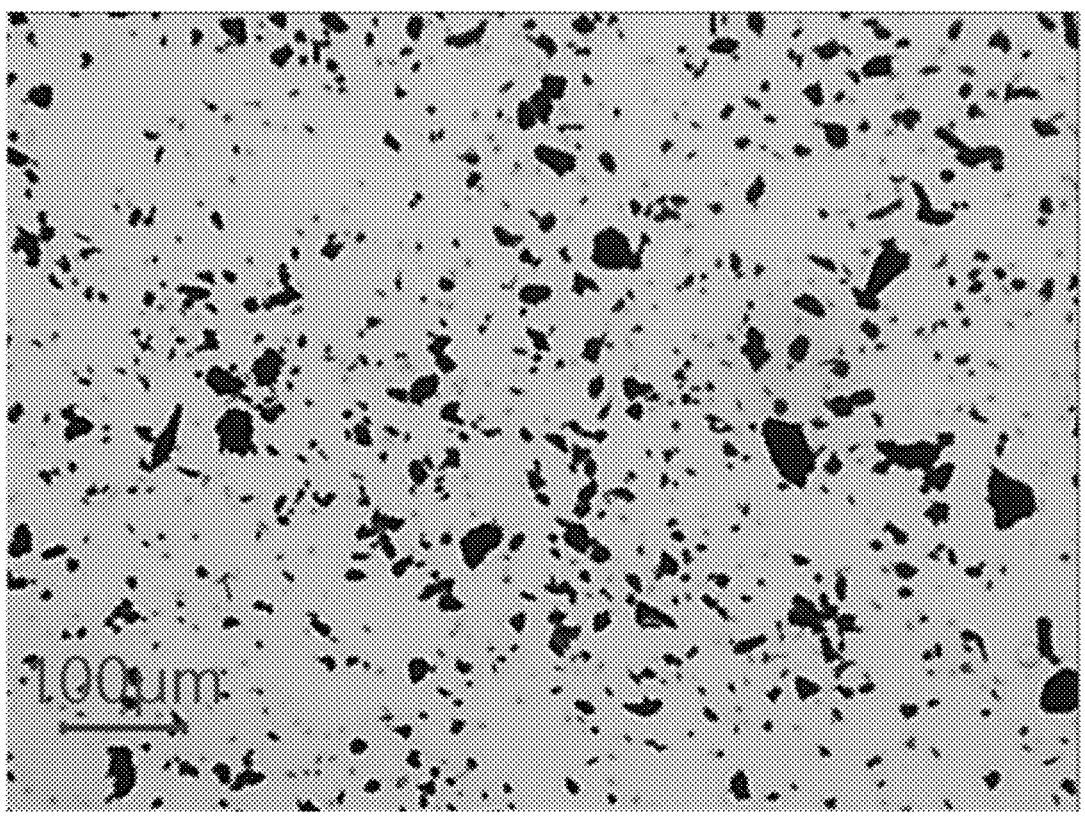
FIG. 5 is a microscopic image of a resin composition according to an embodiment of the present disclosure.

FIGS. 3-5 respectively show microscopic images of the composition following mixing for 3 minutes, 15 minutes and 30 minutes. As can be seen, the extent of dispersion increases with increased mixing time.

Figure 6:
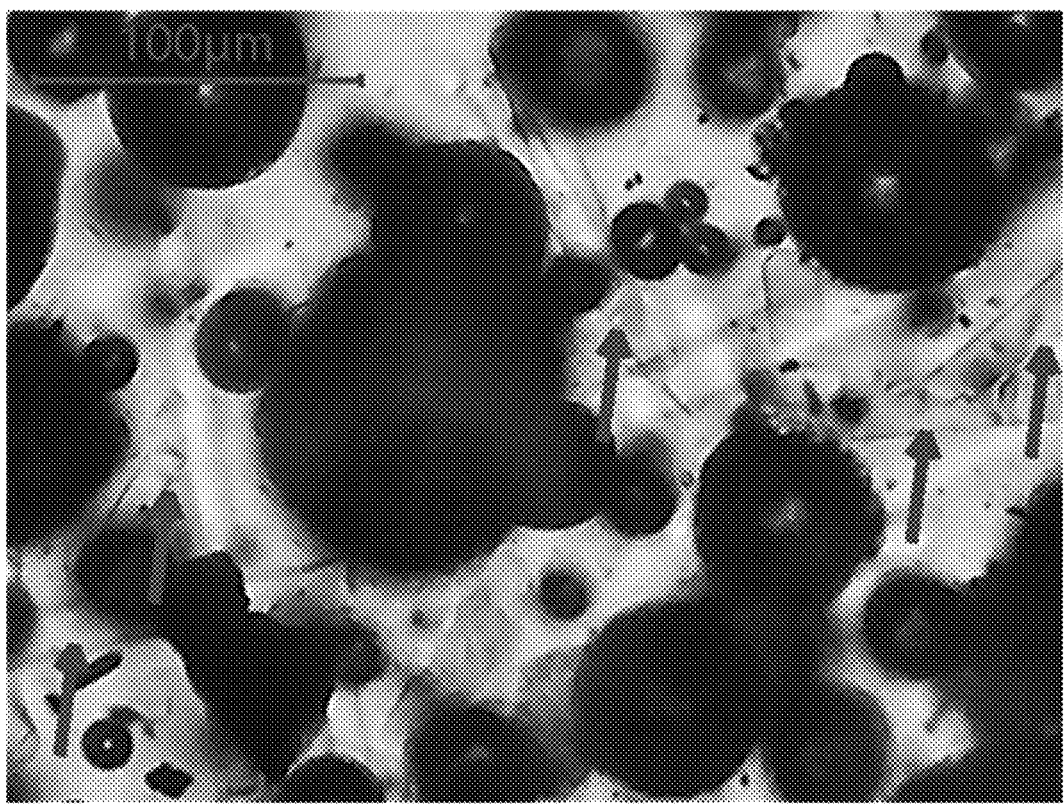
FIG. 6 is a microscopic image of a resin composition according to an embodiment of the present disclosure.
Figure 7:
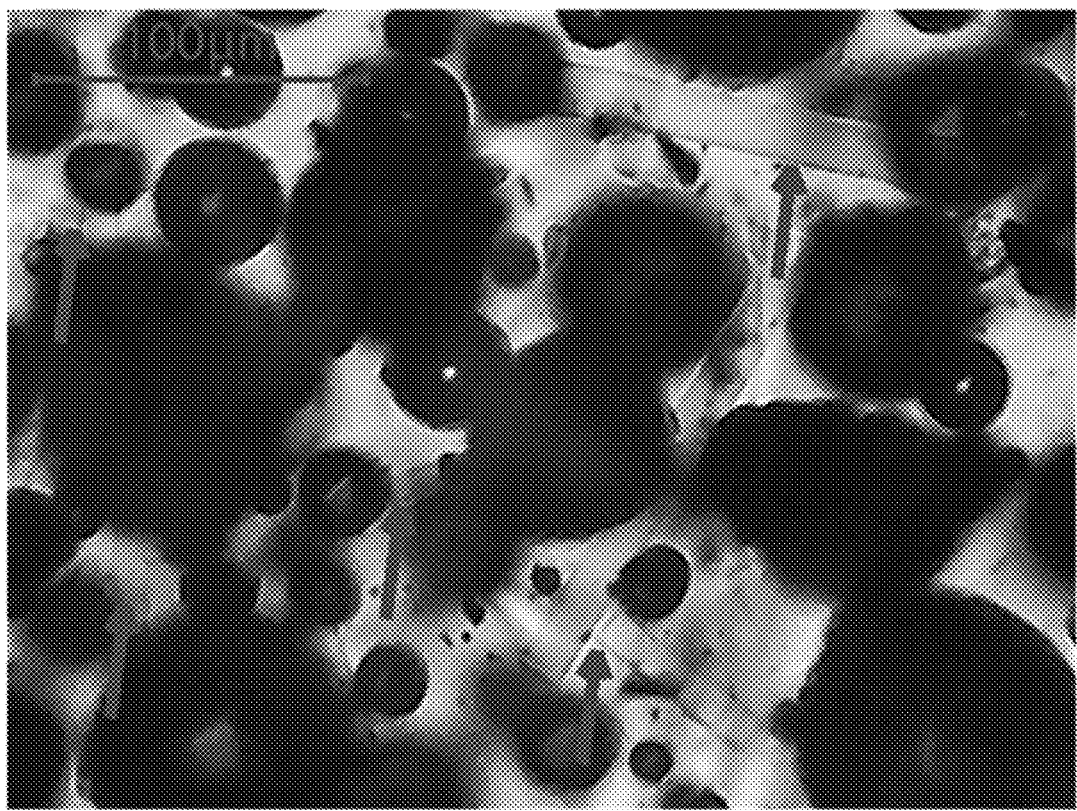
FIG. 7 is a microscopic image of a resin composition according to an embodiment of the present disclosure.
Figure 8:
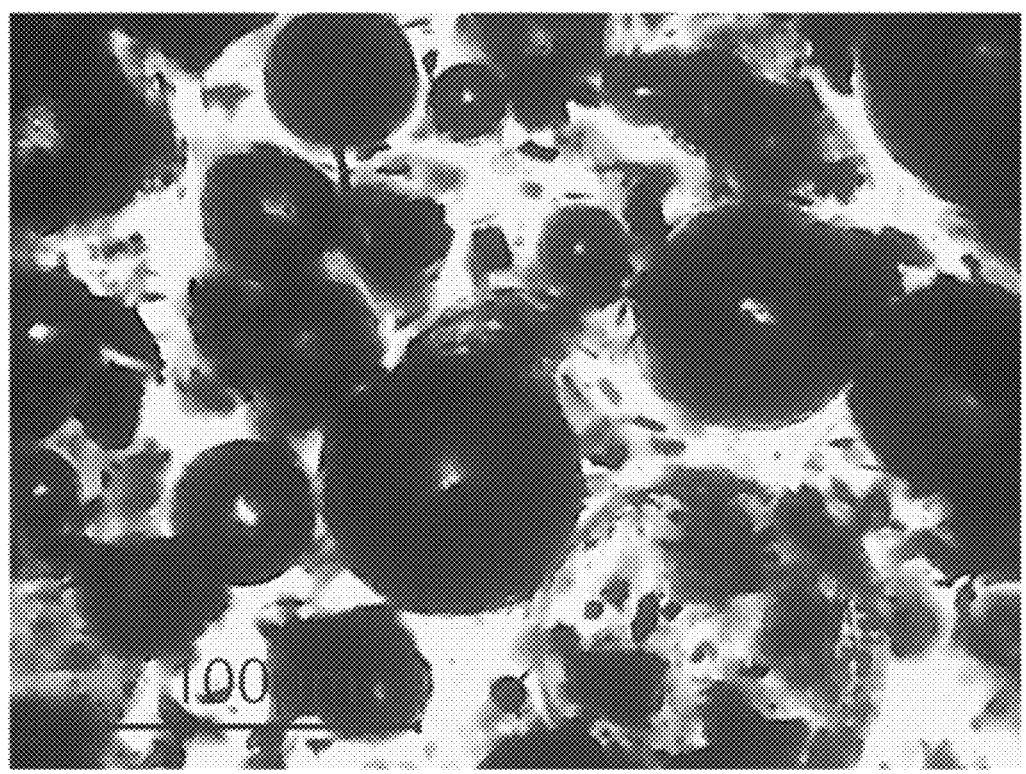
FIG. 8 is a microscopic image of a resin composition according to an embodiment of the present disclosure.

Further examples of resin compositions are provided in FIGS. 6 to 8. FIGS. 6 and 7 show microscopic images of resin compositions containing milled fibreglass, graphene, curable resin (styrene monomer) and milling media (cenospheres and hollow glass microspheres). FIG. 8 shows a microscopic image of graphene dispersed in a curable resin (styrene monomer) with cenospheres and hollow glass microspheres after mixing for 30 minutes, prior to addition of milled fibreglass.

Example 2: Laminate Moisture Uptake

Three panels were subjected to full water submersion at 110° C. at 100 kPa in a pressure vessel and tested for extent of moisture absorption as determined by % increase in weight, measuring at appropriate intervals over a 140-170 hour period. Three panels were tested: 1) a non-graphene-containing laminate containing a terephthalate-NPG resin and milled fibreglass; 2) a panel formed of a graphene-containing fibreglass reinforced resin containing a terephthalate-NPG resin, milled fibreglass, and dispersed graphene; and 3) a panel formed of a laminate including a layer of a graphene-containing fibreglass reinforced resin (containing a terephthalate-NPG resin, milled fibreglass, and dispersed graphene). The results are shown in FIG. 9.

Figure 9:
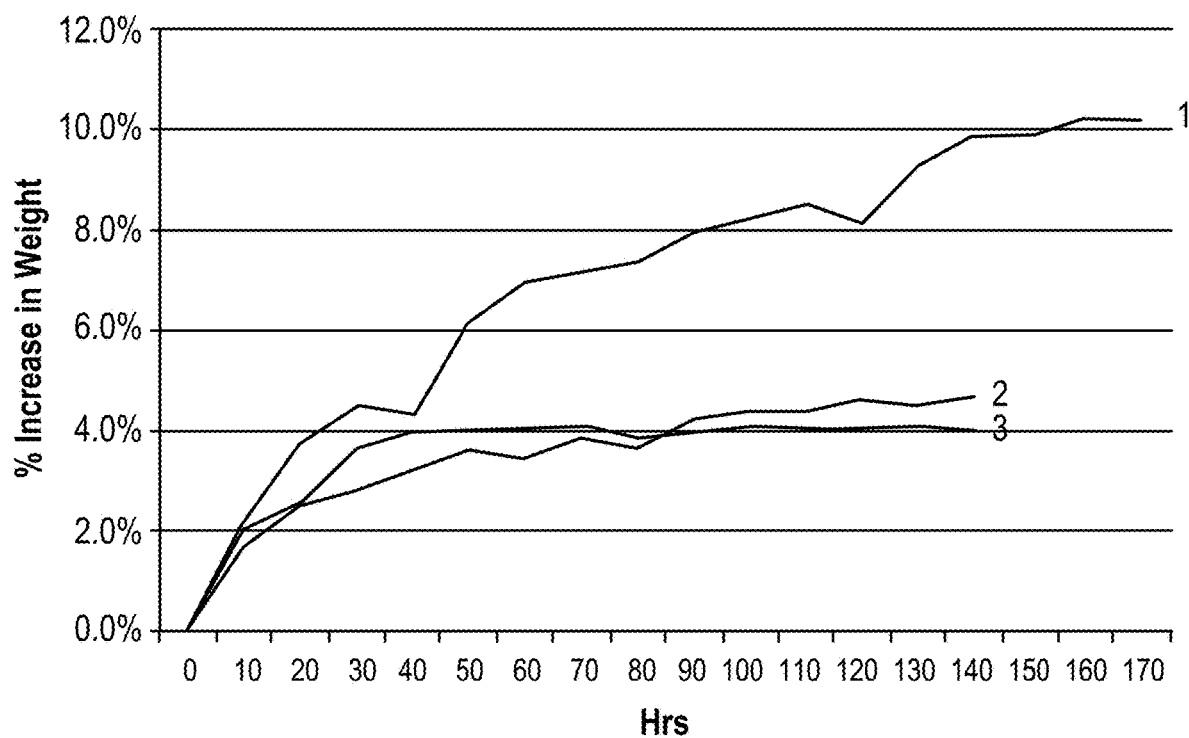
FIG. 9 is a chart showing uptake of moisture over time as measured by % increase in weight for laminates according to the present disclosure and a comparator laminate.

As can be seen from FIG. 9, there was significantly less water uptake, as water vapour, in the graphene-containing panels. The graphene-containing panels had up to about 4% increase in weight over the course of the experiment, compared with 10% for the comparator swimming pool laminate.

Example 3: Laminate Moisture Uptake

A panel formed of a laminate of a graphene-containing fibreglass reinforced resin according to the present disclosure containing a terephthalate-NPG resin, dispersed graphene, and milled fibreglass, and a gelcoat, was subjected to full water submersion at 110° C. at 100 kPa in pressure vessel and tested for extent of moisture absorption as determined by % increase in weight over a 90 hour period. The results are shown in FIG. 10.

Figure 10:
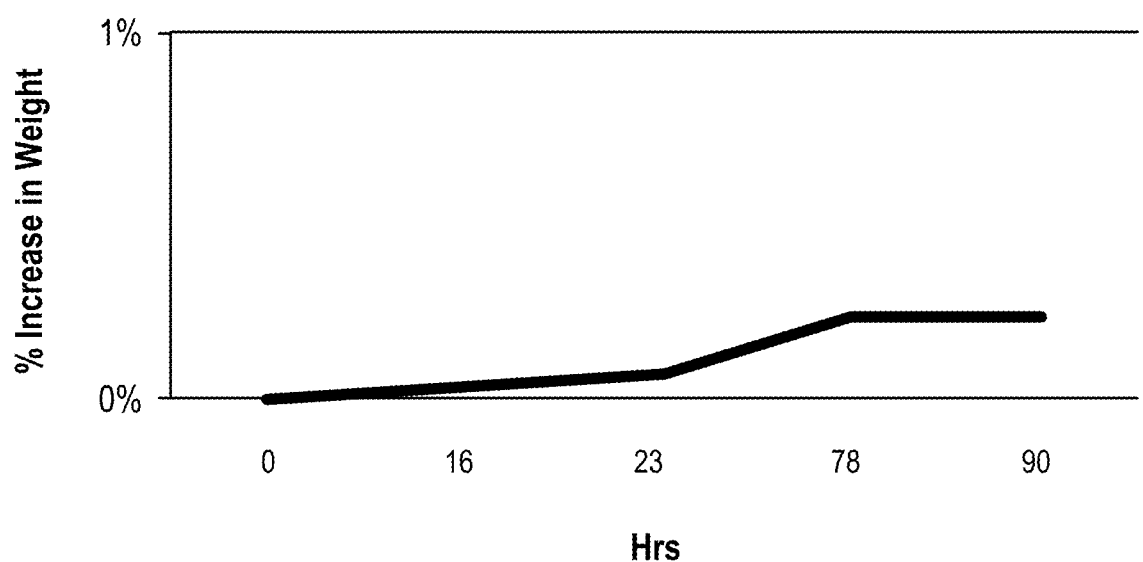
FIG. 10 is a chart showing uptake of moisture over time as measured by % increase in weight for a laminate according to the present disclosure.

As can be seen from FIG. 10, the laminate showed very low levels of moisture uptake (less than 1%) over the course of the experiment.

Example 4: Fibreglass Reinforced Plastic Flexural Strength

Flexural strength was measured for panels containing dispersed graphene (5 mm thick panels made from terephthalate-NPG resin with chopped strand fibreglass mat, resin to glass ratio of 2.5:1, dispersed graphene, resin catalysed using 2% of a Butanox M50 catalyst and rolled through the chopped strand mat) and a comparator containing no graphene. The comparator (sample 0) contained 0% graphene. 3 types of cured resin composition according to the present disclosure were tested, respectively containing graphene of average platelet size micron (samples 1a-1d), 10 micron (samples 2a-2d), or 5 micron (samples 3a-3d), sold under the brand names PureGRAPH® 20, PureGRAPH® 10 and PureGRAPH® 5). The resin compositions contained either 0.5% by weight dispersed graphene (samples 1a, 2a, 3a), 1% by weight dispersed graphene (samples 1b, 2b, 3b), 1.5% by weight dispersed graphene (samples 1c, 2c, 3c) or 3% by weight dispersed graphene (samples 1d, 2d, 3d). The results are shown in the table below.

| Sample | Graphene Concentration (%) | Mean Flexural Modulus (Mpa) | Flexural Modulus Std Dev | Mean Peak Load (N) | Peak Load Std Dev | Mean Flexural Stress (Mpa) | Flexural Stress Std Dev. |
|---|---|---|---|---|---|---|---|
| 0 | 0% | 6717 | 227 | 431 | 42 | 163 | 4.4 |
| 1a | 0.5% | 7547 | 161 | 547 | 27 | 204 | 11.3 |
| 1b | 1.0% | 7849 | 637 | 561 | 57 | 219 | 7.8 |
| 1c | 1.5% | 7618 | 193 | 488 | 56 | 176 | 15.6 |
| 1d | 3.0% | 6181 | 141 | 457 | 19 | 174 | 9 |
| 2a | 0.5% | | | | | 202 | 1.9 |
| 2b | 1.0% | | | | | 211 | 8.0 |
| 2c | 1.5% | | | | | 203 | 4.1 |
| 2d | 3.0% | | | | | 211 | 6.1 |
| 3a | 0.5% | 6838 | 397 | | | 184 | 15.9 |
| 3b | 1.0% | 6991 | 143 | 569 | 22 | 220 | 8 |
| 3c | 1.5% | 7495 | 377 | | | 210 | 9.7 |
| 3d | 3.0% | 7352 | 512 | | | 203 | 14.0 |

Figure 11:
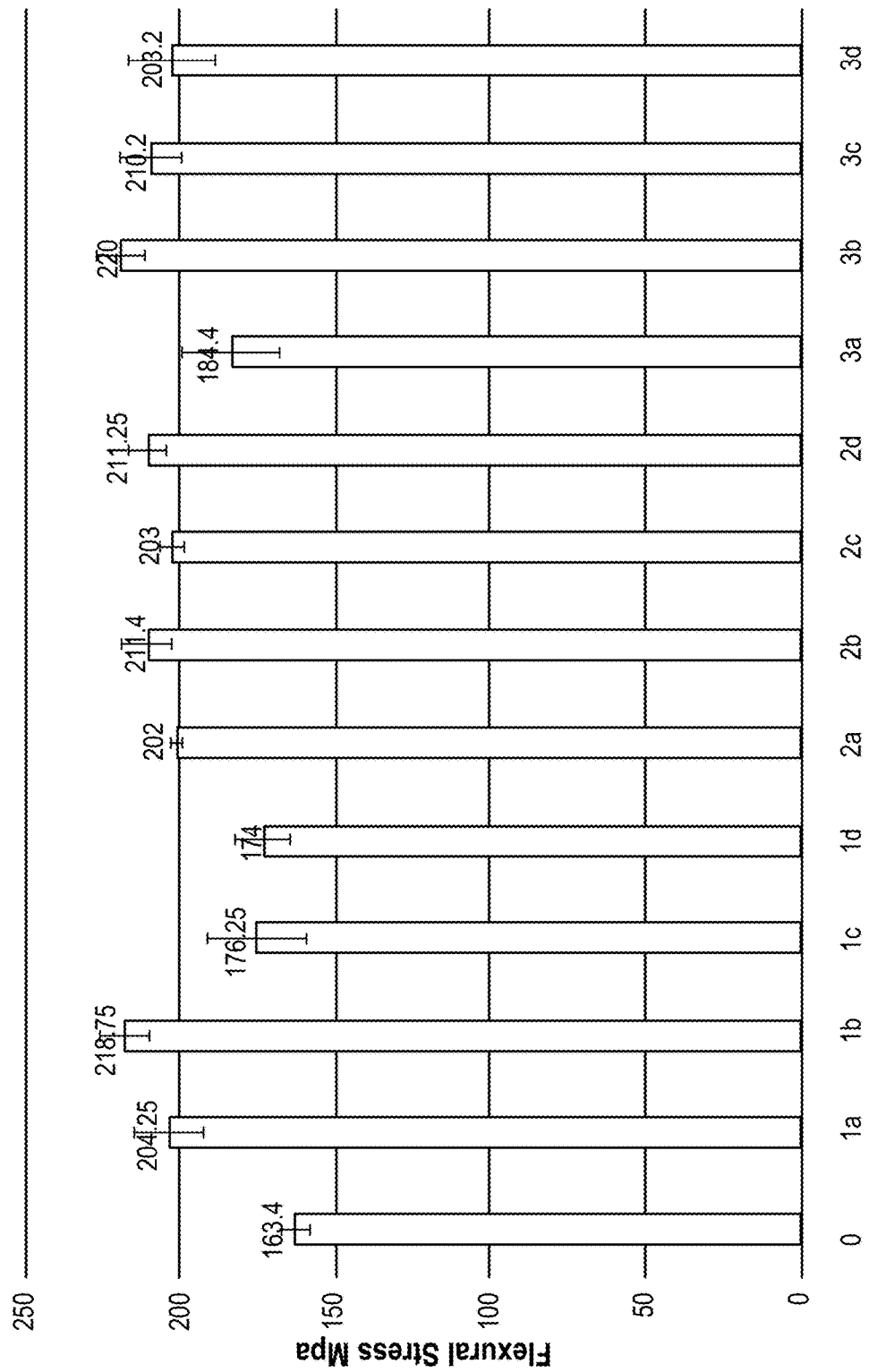
FIG. 11 is a chart showing flexural stress for laminates according to the present disclosure, and a comparator laminate.

The flexural stress results are also shown in FIG. 11. The flexural stress results were higher for the samples according to the present disclosure than for the comparator sample.

EMBODIMENTS

Embodiment 1: A resin composition, said resin composition comprising:
 a) one or more curable resins;
 b) graphene;
 c) one or more milling media; and
 d) milled fibreglass.

Embodiment 2: A resin composition according to embodiment 1, wherein the one or more milling media are hydrophobic.

Embodiment 3: A resin composition according to embodiment 1 or embodiment 2, wherein the one or more milling media are insoluble in the resin composition.

Embodiment 4: A resin composition according to any one of embodiments 1 to 3, wherein the one or more milling media are inert.

Embodiment 5: A resin composition according to any one of embodiments 1 to 4, wherein the crushing strength of the one or more milling media is greater than about 2000 psi (13.79 MPa), or greater than about 3000 psi (20.70 MPa), or greater than about 4000 psi (27.58 MPa).

Embodiment 6: A resin composition according to any one of embodiments 1 to 4, wherein the crushing strength of the one or more milling media is between about 2000 psi (13.79 MPa) and about 4000 psi (27.58 MPa).

Embodiment 7: A resin composition according to any one of embodiments 1 to 6, wherein the one or more milling media have a Mohs hardness of greater than about 4, or greater than about 5, or greater than about 6.

Embodiment 8: A resin composition according to any one of embodiments 1 to 6, wherein, the one or more milling media have a Mohs hardness from about 4 to about 7, or from about 5 to about 7.

Embodiment 9: A resin composition according to any one of embodiments 1 to 8, wherein the one or more milling media comprise one or more of silicon oxides or aluminium oxides.

Embodiment 10: A resin composition according to any one of embodiments 1 to 9, wherein the one or more milling media comprise one or more of hollow glass microspheres, cenospheres and expanded glass aggregate.

Embodiment 11: A resin composition according to any one of embodiments 1 to 10 comprising:
 a. from about 50 wt. % to about 80 wt. % of one or more curable resins;
 b. from about 0.1 wt. % to about 2.0 wt. % graphene;
 c. from about 0.75 wt. % to about 35 wt. % of milling media; and
 d. from about 3 wt. % to about 20 wt. % of milled fibreglass;
based on the total weight of resin composition.

Embodiment 12: A resin composition according to any one of embodiments 1 to 11, wherein the one or more curable resins comprise one or more curable polyester resins, vinyl ester resins and epoxy resins.

Embodiment 13: A resin composition according to any one of embodiments 1 to 12, wherein the one or more curable resins comprise one or more of bisphenol A vinyl ester resin, terephthalate resin, terephthalate-NPG resin, isophthalate resin, isophthalate-NPG resin, orthophthalate resin, and orthophthalate-NPG resin.

Embodiment 14: A resin composition according to any one of embodiments 1 to 13, wherein the one or more curable resins comprise a vinyl ester resin and terephthalate-NPG resin.

Embodiment 15: A resin composition according to any one of embodiments 1 to 14, wherein the one or more curable resins comprise a urethane acrylate modified resin.

Embodiment 16: A resin composition according to any one of embodiments 12 to 14, wherein the vinyl ester resin comprises greater than 10% by weight, based on the total weight of resin in the resin composition, or greater than 20% by weight, or greater than 30% by weight, or greater than 40% by weight, or greater than 50% by weight, or greater than 60% by weight, or greater than 70% by weight, or greater than 80% by weight, or greater than 90% by weight, based on the total weight of resin in the resin composition.

Embodiment 17: A resin composition according to any one of embodiments 1 to 16, wherein the graphene has an average platelet size between about 1 micron and about 100 micron, or between about 5 micron and about 50 micron, or between about 10 micron and about 30 micron.

Embodiment 18: A resin composition according to any one of embodiments 10 to 17, wherein the hollow glass microspheres have a diameter between about 30 micron and about 150 micron.

Embodiment 19: A resin composition according to any one of embodiments 10 to 18, wherein the cenospheres have a diameter between about 20 micron and about 150 micron.

Embodiment 20: A resin composition according to any one of embodiments 10 to 19, wherein the resin composition comprises hollow glass microspheres, cenospheres or both hollow glass microspheres and cenospheres.

Embodiment 21: A resin composition according to any one of embodiments 1 to 20, wherein the milled fibreglass has a fibre length between about 200 microns and about 1000 microns.

Embodiment 22: A resin composition according to any one of embodiments 1 to 21, wherein the milled fibreglass further comprises a sizing agent.

Embodiment 23: A resin composition according to any one of embodiments 1 to 22 further comprising one or more thixotropic agents.

Embodiment 24: A resin composition according to embodiment 23, wherein the thixotropic agent comprises fumed silica, preferably hydrophobic fumed silica.

Embodiment 25: A resin composition according to any one of embodiments 1 to 24, further comprising one or more accelerators, promoters, inhibitors, air release agents, wetting agents and silanes.

Embodiment 26: A resin composition according to any one of embodiments 1 to 25, wherein the resin composition comprises a silane which is 3-methacryloxypropyltrimethoxysilane.

Embodiment 27: A resin composition according to any one of embodiments 1 to 26, wherein the viscosity of the resin composition is from about 500 cP (0.5 Pas) to about 6000 cP (6 Pas).

Embodiment 28: A composite material, said composite material comprising:
a. one or more cured resins;
b. graphene;
c. one or more milling media; and
d. milled fibreglass.

Embodiment 29: A composite material according to embodiment 28, wherein the one or more milling media are hydrophobic.

Embodiment 30: A composite material according to embodiment 28 or embodiment 29, wherein the one or more milling media are insoluble in the composite material.

Embodiment 31: A composite material according to any one of embodiments 28 to 30, wherein the one or more milling media are inert.

Embodiment 32: A composite material according to any one of embodiments 28 to 31, wherein the crushing strength of the one or more milling media is greater than about 2000 psi (13.79 MPa), or greater than about 3000 psi (20.70 MPa), or greater than about 4000 psi (27.58 MPa).

Embodiment 33: A composite material according to any one of embodiments 28 to 31, wherein the crushing strength of the one or more milling media is between about 2000 psi (13.79 MPa) and about 4000 psi (27.58 MPa).

Embodiment 34: A composite material according to any one of embodiments 28 to 33, wherein the one or more milling media have a Mohs hardness of greater than about 4, or greater than about 5, or greater than about 6.

Embodiment 35: A composite material according to any one of embodiments 28 to 33, wherein, the one or more milling media have a Mohs hardness from about 4 to about 7, or from about 5 to about 7.

Embodiment 36: A composite material according to any one of embodiments 28 to 35, wherein the one or milling media comprise one or more of silicon oxides or aluminium oxides.

Embodiment 37: A composite material according to any one of embodiments 28 to 36, wherein the one or more milling media comprise one or more of hollow glass microspheres, cenospheres and expanded glass aggregate.

Embodiment 38: A composite material according to any one of embodiments 28 to 37 comprising:
a. from about 50 wt. % to about 80 wt. % of one or more cured resins;
b. from about 0.1 wt. % to about 2.0 wt. % graphene;
c. from about 0.75 wt. % to about 35 wt. % of one or more milling media; and
d. from about 3.0 wt. % to about 20 wt. % of milled fibreglass;
based on the total weight of the composite material.

Embodiment 39: A composite material according to any one of embodiments 28 to 38, wherein the one or more cured resins comprise one or more cured polyester resins, vinyl ester resins and epoxy resins.

Embodiment 40: A composite material according to any one of embodiments 28 to 39, wherein the one or more cured resins comprise one or more of bisphenol A vinyl ester resin, terephthalate resin, terephthalate-NPG resin, isophthalate resin, isophthalate-NPG resin, orthophthalate resin, and orthophthalate-NPG resin.

Embodiment 41: A composite material according to any one of embodiment 28 to 40, wherein the one or more cured resins comprise a vinyl ester resin and terephthalate-NPG resin.

Embodiment 42: A composite material according to any one of embodiments 28 to 41, wherein the cured vinyl ester is present in an amount of greater than 10% by weight, based on the total weight of cured resin in the composite material, or greater than 20% by weight, or greater than 30% by weight, or greater than 40% by weight, or greater than 50% by weight, or greater than 60% by weight, or greater than 70% by weight, or greater than 80% by weight, or greater than 90% by weight, based on the total weight of cured resin in the composite material.

Embodiment 43: A composite material according to any one of embodiments 28 to 40, wherein the one or more curable resins comprise a urethane acrylate modified resin.

Embodiment 44: A composite material according to any one of embodiments 28 to 43, wherein the graphene has an average platelet size between about 1 micron and about 100 micron, or between about 5 micron and about 50 micron, or between about 10 micron and about 30 micron.

Embodiment 45: A composite material according to any one of embodiments 37 to 44, wherein the hollow glass microspheres have a diameter between about 30 micron and about 150 micron.

Embodiment 46: A composite material according to any one of embodiments 37 to 45, wherein the cenospheres have a diameter between about 30 micron and about 150 micron.

Embodiment 47: A composite material according to any one of embodiments 28 to 46, wherein the composite material comprises both hollow glass microspheres and cenospheres.

Embodiment 48: A composite material according to any one of embodiments 28 to 47, wherein the milled fibreglass has a fibre length between about 200 microns and about 1000 microns.

Embodiment 49: A composite material according to any one of embodiments 28 to 48, wherein the milled fibreglass further comprises a sizing agent.

Embodiment 50: A composite material according to any one of embodiments 28 to 49 further comprising one or more thixotropic agents.

Embodiment 51: A composite material according to embodiment 50, wherein the thixotropic agent comprises fumed silica, preferably hydrophobic fumed silica.

Embodiment 52: A fibreglass reinforced resin comprising the composite material according to any one of embodiments 28 to 51 and further fibreglass.

Embodiment 53: A fibreglass reinforced resin according to embodiment 52, wherein the further fibreglass has a fibre length greater than about 1 mm, or greater than about 5 mm, or greater than about 8 mm.

Embodiment 54: A fibreglass reinforced resin according to embodiment 52 or embodiment 53, wherein the fibreglass reinforced resin has a flexural strength greater than about 124 MPa, or greater than about 130 MPa, or greater than about 140 MPa, or greater than about 150 MPa, or greater than about 160 MPa.

Embodiment 55: A fibreglass reinforced resin according to embodiment 52 or embodiment 53, wherein the fibreglass reinforced resin has a flexural strength between about 124 MPa and about 160 MPa, or between about 140 MPa and about 160 MPa.

Embodiment 56: A fibreglass reinforced resin according to any one of embodiments 52 to 55, wherein the fibreglass reinforced resin has a flexural modulus greater than about 7,700 MPa, or greater than about 8,000 MPa, or greater than about 8,500 MPa, or greater than about 9,000 MPa, or greater than about 9,500 MPa, or greater than about 10,000 MPa.

Embodiment 57: A fibreglass reinforced resin according to any one of embodiments 52 to 55, wherein the fibreglass reinforced resin has a flexural modulus between about 7,700 MPa and about 10,000 MPa, or between about 8,500 MPa and about 10,000 MPa.

Embodiment 58: A fibreglass reinforced resin according to any one of embodiments 52 to 57, wherein the fibreglass reinforced resin has a tensile strength greater than about 100 MPa, or greater than about 110 MPa, or greater than about 120 MPa, or greater than about 130 MPa, or greater than about 140 MPa.

Embodiment 59: A fibreglass reinforced resin according to any one of embodiments 52 to 57, wherein the fibreglass reinforced resin has a tensile strength between about 100 MPa and about 140 MPa, or between about 110 MPa and about 140 MPa.

Embodiment 60: A laminate comprising one or more layers of fibreglass reinforced resin according to any one of embodiments 52 to 59.

Embodiment 61: A laminate according to embodiment 60, further comprising one or more layers of another material, for example one or more layers of a polymer or mixture of polymers.

Embodiment 62: A laminate according to embodiment 61, wherein the one or more other layers comprises one or more gelcoats.

Embodiment 63: A laminate according to embodiment 62, wherein the gelcoat comprises one or more polyesters or vinyl esters.

Embodiment 64: A swimming pool or spa pool comprising a laminate according to any one of embodiments 60 to 63.

Embodiment 65: A method of preparing a resin composition according to any one of embodiments 1 to 27, said method comprising:
 a. forming a mixture of one or more curable resins, graphene, and one or more milling media;
 b. agitating the mixture to disperse the graphene; and
 c. adding milled fibreglass.

Embodiment 66: A method according to embodiment 65, further comprising adding one or more thixotropic agents.

Embodiment 67: A method according to embodiment 65 or embodiment 66, further comprising degassing the resin composition.

Embodiment 68: A method of preparing a resin composition according to any one of embodiments 1 to 27, said method comprising:
 a. forming a mixture of one or more curable resins, graphene, and one or more milling media;
 b. agitating the mixture to disperse the graphene;
 c. combining the mixture formed in b) with one or more further curable resins and one or more further milling media, and agitating to further disperse the graphene; and
 d. adding milled fibreglass.

Embodiment 69: A method according the embodiment 68, further comprising adding one or more thixotropic agents, air release, wetting agents and/or silanes.

Embodiment 70: A method according to embodiment 67 or embodiment 68, further comprising the step of degassing the resin composition.

Embodiment 71: A method of preparing a composite material according to any one of embodiments 28 to 51 comprising curing a resin composition according to any one of embodiments 1 to 27.

Embodiment 72: A method of manufacturing a fibreglass reinforced resin according to any one of embodiments 52 to 59 comprising the steps of spraying a mixture comprising a resin composition according to any one of embodiments 1 to 27 and fibreglass rovings and curing the resin composition.

It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. For example, the relative quantities of the ingredients may be varied or optional ingredients deleted to optimize the desired effects, additional ingredients may be added, and/or similar ingredients may be substituted for one or more of the ingredients described. Additional advantageous features and functionalities associated with the processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

The invention claimed is:

1. A composition comprising
 a mixture of one or more curable or cured resins,
 graphene,
 and one or more inert milling media
 d) that are hydrophobic and/or insoluble in the composition, wherein the one or more milling media is capable of dispersing graphene.

2. A composition according to claim 1, wherein the crushing strength of the one or more milling media is greater than about 2000 psi (13.79 MPa), or greater than about 3000 psi (20.70 MPa), or greater than about 4000 psi (27.58 MPa).

3. A composition according to claim 1, wherein the one or more milling media have a Mohs hardness of greater than about 4, or greater than about 5, or greater than about 6.

4. A composition according to claim 1, wherein the one or more milling media comprise one or more of hollow glass microspheres, cenospheres and expanded glass aggregate.

5. A composition according to claim 1, wherein the one or more curable or cured resins comprise one or more of bisphenol A vinyl ester resin, terephthalate resin, terephthalate-NPG resin, isophthalate resin, isophthalate-NPG resin, orthophthalate resin, orthophthalate-NPG resin and urethane acrylate modified resin.

6. A composition according to claim 1, wherein the graphene has an average platelet size between about 1 micron and about 100 micron, or between about 5 micron and about 50 micron, or between about 10 micron and about 30 micron.

7. A composition according to claim 1, wherein the composition comprises milling media which are hollow glass microspheres having a diameter between about 30 micron and about 150 micron.

8. A composition according to claim 1, further comprising one or more accelerators, promoters, inhibitors, air release agents, wetting agents, silanes and low styrene emission additives.

9. A composite material, said composite material comprising
　d) a cured composition according to claim 1.

10. A fibreglass reinforced resin comprising the composite material according to claim 7 and further fibreglass.

11. A laminate comprising one or more layers of fibreglass reinforced resin according to claim 8.

12. A swimming pool or spa pool comprising a laminate according to claim 9.

13. A composition according to claim 1, wherein the composition comprises milling media which are cenospheres having a diameter between about 20 micron and about 150 micron.

\* \* \* \* \*